United States Patent
Ederer et al.

(10) Patent No.: US 10,220,568 B2
(45) Date of Patent: Mar. 5, 2019

(54) INTERCHANGEABLE CONTAINER WITH MOVEABLE SIDE WALLS

(71) Applicant: Voxeljet AG, Friedberg (DE)

(72) Inventors: Ingo Ederer, Geltendorf (DE); Daniel Günther, München (DE)

(73) Assignee: VOXELJET AG, Friedberg (DE)

( * ) Notice: Subject to any disclaimer, the term of this patent is extended or adjusted under 35 U.S.C. 154(b) by 12 days.

(21) Appl. No.: 15/039,267

(22) PCT Filed: Dec. 1, 2014

(86) PCT No.: PCT/DE2014/000609
§ 371 (c)(1),
(2) Date: May 25, 2016

(87) PCT Pub. No.: WO2015/081926
PCT Pub. Date: Jun. 11, 2015

(65) Prior Publication Data
US 2017/0050378 A1    Feb. 23, 2017

(30) Foreign Application Priority Data
Dec. 2, 2013   (DE) .................. 10 2013 018 031

(51) Int. Cl.
| | |
|---|---|
| *B29C 67/00* | (2017.01) |
| *B29C 64/20* | (2017.01) |
| *B29C 64/165* | (2017.01) |
| B22F 3/105 | (2006.01) |
| B29K 105/00 | (2006.01) |
| B29C 64/141 | (2017.01) |

(52) U.S. Cl.
CPC ............ *B29C 64/20* (2017.08); *B29C 64/165* (2017.08); *B22F 2003/1056* (2013.01); *B29C 64/141* (2017.08); *B29K 2105/251* (2013.01); *B29K 2905/02* (2013.01); *Y02P 10/295* (2015.11)

(58) Field of Classification Search
CPC ..... B22F 3/1055; B29C 64/20; B29C 64/153; B29C 64/165; B29C 64/141; B33Y 10/00; B33Y 30/00
See application file for complete search history.

(56) References Cited

U.S. PATENT DOCUMENTS

| | | |
|---|---|---|
| 3,913,503 A | 10/1975 | Becker |
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420, 06/1990, Deckard (withdrawn)

(Continued)

*Primary Examiner* — Yogendra N Gupta
*Assistant Examiner* — Ninh Le
(74) *Attorney, Agent, or Firm* — The Dobrusin Law Firm, P.C.

(57) ABSTRACT

The invention relates to a device for producing three-dimensional models.

24 Claims, 13 Drawing Sheets

(56) References Cited

U.S. PATENT DOCUMENTS

| | | |
|---|---|---|
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Ferret et al. |
| 6,713,125 B1 | 3/2004 | Sherwood et al. |
| 6,722,872 B1 * | 4/2004 | Swanson ............. B29C 41/36 425/225 |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Corp Z |
| 7,296,990 B2 | 11/2007 | Devos et al. |
| 7,332,537 B2 | 2/2008 | Bredt et al. |
| 7,348,075 B2 | 3/2008 | Farr et al. |

(56) References Cited

U.S. PATENT DOCUMENTS

| | | |
|---|---|---|
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0050031 A1 | 12/2001 | Bredt et al. |
| 2001/0050448 A1 | 12/2001 | Kubo et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni et al. |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0212584 A1 | 8/2010 | Ederer et al. |
| 2010/0207288 A1 | 9/2010 | Enrico |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1* | 11/2012 | Grasegger ............. B33Y 30/00 118/300 |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |

(56) References Cited

U.S. PATENT DOCUMENTS

| | | |
|---|---|---|
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunther et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Gunther et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 10047614 C2 | 4/2002 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102010013733 A1 | 10/2011 |
| DE | 102010015451 A1 | 10/2011 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 361847 B1 | 4/1990 |
| EP | 0431924 B1 | 6/1991 |
| EP | 1415792 | 5/2004 |
| EP | 1457590 A | 9/2004 |
| EP | 1775103 A2 | 4/2007 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 90/03893 A1 | 4/1990 |
| WO | 01/40866 A2 | 6/2001 |
| WO | 01/078969 A2 | 10/2001 |
| WO | 2004/014637 A1 | 2/2004 |
| WO | 2006/100166 A1 | 9/2006 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

International Search Report, Application No. PCT/DE2014/000609, dated Jun. 11, 2016.

Written Opinion of the International Search Authority, Application No. PCT/DE2014/000609, dated Jun. 11, 2016.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, p. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

(56) References Cited

OTHER PUBLICATIONS

Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?"
Chinese Office Action, CN Application No. 201480065717.2 dated Jun. 1, 2017.

* cited by examiner

INTERCHANGEABLE CONTAINER WITH MOVEABLE SIDE WALLS

CLAIM OF PRIORITY

This application is a national phase filing under 35 USC § 371 from PCT Application serial number PCT/DE2014/000609 filed on Dec. 1, 2014, and claims priority therefrom. This application further claims priority from German Patent Application DE 10 2013 018 031.7 filed on Dec. 2, 2013. PCT Application Number PCT/DE2014/000609 and German Patent Application Number 10 2013 018 031.7 are each incorporated herein in their entireties by reference.

DESCRIPTION

The invention relates to a device and its use in a method for producing three-dimensional models.

A method for producing three-dimensional objects from computer data is described in the European patent specification EP 0 431 924 B1. In this method, a particulate material is applied in a thin layer to a platform, and a binder material is selectively printed onto the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above.

These steps are repeated until a certain, desired height of the object is reached. A three-dimensional object is thereby produced from the printed and solidified areas.

After it is completed, this object produced from solidified particulate material is embedded in loose particulate material and is subsequently removed therefrom. This is done, for example, using an extractor. The desired objects remain afterward, from which powder deposits are removed, e.g., by means of manual brushing.

Of all the layering techniques, 3D printing based on powdered materials and the supply of liquid binder is the fastest method.

This method may be used to process different particulate materials, including natural biological raw materials, polymers, metals, ceramics and sands (not an exhaustive list).

The machines used in methods of this type often contain a job box, which can be inserted into and removed from the 3D printing machine for the purpose of increasing the machine runtimes. The job box may be removed from the machine for the purpose of freeing the components of unsolidified material, i.e., to unpack them. Another job box may then be immediately inserted into the machine, and printing may continue right away, avoiding unnecessary, unproductive machine down times. Job boxes of this type have a building platform to which the particulate material is applied. This building platform is generally adjustable in height and is lowered during 3D printing until the printing process is completed. The desired layer thickness is adjusted by moving and positioning the building platform.

The precise positioning of the building platform is extremely important and crucial for the production of dimensionally accurate components. Not only is the positioning of the building platform at the drive engagement point important, but a uniform positioning of all points of the building platform also influences the construction accuracy. Possible deformations of the building platform pose a problem to the precise and accurate production of components.

A precise and even positioning, however, presents an enormous difficulty in large machines. The large dimensions result in high bending torques, which deform the building platform. If the building platform is reinforced accordingly, however, heavy weights, in turn, must be positioned precisely. The various aspects of these problems reduce the achievable accuracy of the device or prevent an acceptable cost margin.

The forces and the resulting bending torques are caused by different influences. First of all, the powder feedstock, which grows during the building process, acts as an increasing planar load. Secondly, the growing feedstock presses against the walls of the build container. Reaction forces result here, which, in turn, act upon the building platform. Forces are also produced by the seal, which seals the moving building platform against the stationary side walls.

Approaches to the growing planar load are described in patent specifications. For example, DE 10 2010 013 733 A1 discloses a device, in which the build container is designed as an immobile worktable. The devices for generating a new powder layer and for selective solidification are displaceable in the building direction of the device. The design of the building platform may be easily adapted to the rigidity requirements. Because it is designed without walls, however, the device is limited in the range of materials that may be used.

The sealing forces may be influenced by structural measures. One option is thus to use a build container which is equipped with a felt seal for the purpose of reducing seal friction. Inflatable seals may also be used to minimize the contact force.

The lateral rubbing action of the feedstock against the side walls is an unresolved problem in build containers or job boxes according to the prior art. According to the prior art, the effects of the forces resulting therefrom are mitigated by structural measures. Build containers are used whose driving points were selected for the purpose of minimizing deflection. In this case, planar loads may be taken into account by the weight of the material and the friction effect, and linear loads may be taken into account by the seal. Despite this optimization, more massive designs are created than would be necessary to actually support the weight force.

An also structural measure for reducing the force effects is to shorten the flux of force within the device. A passage through the build container wall is implemented, e.g., in DE 100 47 614 C2. This passage is sealed against through-flow of the particulate material by a belt or a flap. For heavy feedstocks, devices are provided with a correspondingly large design. The approach using the flap is suitable only for light-weight particulate material that applies very little pressure to the wall.

When moving the building platform, in particular, a friction is produced laterally, which results in stresses within the particulate application material. Due to these stresses, movements may occur in the particulate application material, and the predetermined component points printed on the basis of the CAD data may be displaced thereby. The spatial points present in the component then ultimately deviate from the CAD data, and the printed component no longer corresponds 1:1 to the data record. The printed component is thus inaccurate. This inaccuracy is based in large part on the friction problem.

However, this problem has not been identified in the literature and in the prior art as a problem and a cause of inaccurately produced components. As a result, this problem has not been addressed to a satisfactory degree, nor are there any approaches thereto in the literature and in the prior art.

The object of the invention is therefore to provide a device which solves the problems described above and, in particular, provides a job box, with the aid of which high-quality components may be produced with a high reproduction accuracy, and which makes available, in particular job boxes having a reduced friction problem or an approach which avoids or at least helps reduce the disadvantages of the prior art.

BRIEF DESCRIPTION OF THE INVENTION

The invention relates to a build container or job box, which makes it possible to produce high-quality components and which has, in particular, a reduced friction problem. This object is achieved by two, preferably three, advantageously four laterally situated, movable side walls, which are able to preferably move at the same speed as the building platform in the job box according to the invention.

In another aspect, the invention relates to a 3D printing method, in which the build container (job box) according to the invention may be used.

DETAILED DESCRIPTION OF THE INVENTION

A number of terms in the invention are explained in greater detail below.

Within the meaning of the invention, "3D printing methods" relates to all methods known from the prior art which facilitate the construction of components in three-dimensional molds and are compatible with the described method components and devices. In particular, these are powder-based methods, for example SLS (selective laser sintering).

Within the meaning of the invention, "selective binder application" or "selective binder system application" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Molded body" or "component" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device and a heating means and other components which are known to those skilled in the art and therefore do not need to be listed in greater detail here.

All materials known for powder-based 3D printing, in particular sands, ceramic powders, metal powders, plastics, wood particles, fibrous materials, celluloses and/or lactose powders, may be used as "particulate materials." The particulate material is preferably a dry, free-flowing and a cohesive, firm powder.

"Build space" is the geometric place in which the particulate material feedstock grows during the build process by repeated coating with particulate material. The build space is generally delimited by a base, the building platform, by walls and an open cover surface, the build plane.

A "build container" or, in particular, a "job box" within the meaning of the invention implements a build space. As a result, it has a base, walls and an open access area, the build plane. The build container always includes parts which do not move relative to the frame of the 3D printing device. Removable build containers make it possible to operate the machine more or less continuously. While the parts in a first building operation are being unpacked, new parts may be printed within the machine in a second build container.

The "printing and coater plane" is the abstraction of the location of the building process currently in progress. Since the dosing unit and the coater are structurally moved in the device on a positioning unit with shared components at nearly one height, the "printing and coater plane" are viewed in this description as being situated at the upper edge of a newly applied layer.

The "building platform" moves relative to the printing and coater plane. This relative movement takes place during the building process in interrupted movements in the layer thickness. It defines the layer thickness.

"Container wall" or "wall" or "side wall" designates a barrier to the particulate material. The particulate material is unable to travel from one side of the wall to the other. Walls within the meaning of the invention may have a flexible or rigid design. The deflections for the "rigid" criterion are minor with respect to the workpiece tolerances in a given material system.

A "tribological pairing" within the meaning of the invention is a material contact whose coefficient of friction is significantly below that of two equal materials in contact or of the contact between particulate material and a wall material.

A "seal" designates two structural elements which prevent a passage of the particulate material through contact points between walls moving relative to each other or between walls and a building platform.

The invention, along with its preferred specific embodiments, is described in greater detail below The invention relates to a build container, in particular a job box, for a device for producing three-dimensional models by means of layering, which includes a build space on a building platform, which is adjustable in height within the build container and is preferably removable therefrom, at least two side walls, which are designed in such a way that during the displacement of the building platform, the kinetic friction between the constructed layers and the side walls is reduced or essentially avoided, the building platform and the at least two side walls being moved at the same speed.

In one aspect, the invention is the direct reduction of the forces between the particulate material and the side wall in the build container. Different structural measures may be helpful for this purpose. The avoidance of the relative movements also does not cause any effects of force in addition to gravity in the powder and may thus avoid undesirable settling of the powder cake.

As a result, it may be advantageously achieved that no or few forces occur which have a negative effect on the stability of the applied and deposited layers, and the reproduction accuracy may thus be increased in the printed components.

In one preferred specific embodiment of the invention, the build container is characterized in that 3 or 4 side walls are designed as described above. The side walls of the build container are preferably movable in the building direction. The movable side walls are furthermore advantageously movable relative to two fixed side walls in the build container.

The side walls are designed in such a way that they advantageously serve the purpose of the invention. The side walls are preferably designed to be rigid with respect to the feedstock pressure. All reinforcements, cross-braces known to those skilled in the art may preferably be used.

In one preferred specific embodiment, the build container is characterized in that the side walls are not rigid with respect to the feedstock pressure and are supported via additional side walls. Preferably at least one, preferably 2, 3 or 4, side wall(s) is/are designed to be flexible in one direction. It is furthermore preferred that at least one, preferably 2, 3 or 4, side wall(s) is/are a segmented and/or metallic wall and is/are designed to be flexible in one direction.

In another preferred specific embodiment, the build container is characterized in that [sic; it] has a metal/plastic tribological pairing for reducing the friction effect. The build container preferably includes at least one roller bearing for reducing the friction effect. The build container furthermore preferably includes a supported belt, which is flexible in all directions, as the side wall.

The build container may furthermore preferably include a belt made of multiple materials having an antifriction layer. A continuous belt is preferably used as the side wall. This belt is particularly preferably a finite belt, and it is tensioned by means of springs or by the weight force. The finite belt is preferably wound up in the upper area of the build container.

In other preferred specific embodiments, the invention relates, in particular, to a device for producing a component (3D molded body), wherein (a) a particle layer is applied to a building platform (102) in a first step with the aid of a powder coater (101); (b) a binder (400) is selectively applied in a second step with the aid of a binder dosing device (100); (c) the applied layer or layers is/are subjected to a heat treatment in another step with the aid of a heat source (600); (d) the building platform (102) is lowered by the thickness of one layer, or the powder coater (101) and possibly additional device components is/are raised by the thickness of one layer; steps a) through d) are repeated until the component is built up.

According to the nature of particulate material (300), the resulting feedstock constitutes a load for the build container and the building platform. Characteristic pressure profiles (201), which are similar to hydrostatic pressures, occur on walls (200). Linear characteristics of the pressure over the build height do not occur in the static situation. However, if the powder is excited by mechanical vibrations, nearly hydrostatic, i.e., linear, pressure characteristics occur.

The pressure loads on the container wall caused by the powder represent forces normal to the wall. Once a movement perpendicular to the direction of force occurs, reaction forces arise via the friction.

The flux of force usually closes over extensive parts of the device. FIG. 3 shows a sectional view of a possible device. The force arises between container walls (200) and feedstock (300). Due to the feedstock, the force is conducted into container base (102). The course continues through driving points (301), via coupling (302), to the Z-axis drive, which is usually designed as a lifting spindle (303). The latter is usually supported on the main frame of the device via a bearing (304). The flux of force closes over the build container retaining bolt, which, in turn, is mounted on the frame of the device, and via the build container wall.

Depending on the structural design, bendings and elongations which influence the precision of the device occur due to the flux of force. According to the invention, the flux of force is not predominantly structurally shortened, and the device does not have a load-optimized design, but instead the effect of the force of the friction is minimized during relative movement.

The friction due to the direct contact between the wall and particulate material could be minimized by a coating. Abrasive particulate materials, however, would quickly make this coating ineffective during relative movement. Even plastic powders have an abrasive effect.

A device which carries out the aforementioned steps for producing models inside a build container is one approach to avoiding relative movements. During the building process, the coating and printing unit (100, 101) travels out of the build container. The build container may then be replaced in the upper end position. A device of this type has the disadvantage that the coating unit (101) and dosing unit (100) parts have finite dimensions and cover not only the work area. This would unnecessarily enlarge the device. In addition, the acceleration ramps of the components must be taken into account, since their function is carried out flawlessly only in the case of linear movement.

This technically unfavorable design may also be reduced, according to the invention, to two walls positioned relative to the feedstock. FIG. 6 shows an example of the build container design of a device of this type.

For this purpose, a U-shaped body is formed, which comprises two rigid walls (400) and build platform (102). This body is moved between two rigid, frame-fixed walls (400), which are situated perpendicularly to the walls of the U-shaped body. Seals (401), which prevent an outflow of particulate material, are mounted on the end faces of the body. In this device, plane (701) of the new layers to be formed is always at the upper edge of the frame-fixed walls.

The coater and the dosing unit in this device may be moved through the resulting "shaft" and may be accelerated. The other function features are the same as those of a device having a conventional build container.

In this design, the forces on the moving walls do not result in any friction effect. The forces on the upright walls produce the same frictional forces that also arise in a conventional design. In the arrangement of the overall structure according to the invention, however, the forces and the particularly harmful bending torques on the building platform may be significantly reduced.

The limitations in the displacement area of the dosing unit and coater are bothersome in a device of this type. To avoid this, the walls must be conceptually provided in the dosing and coater plane during the downward movement of the building platform.

An effect of this type may be achieved during the first approach by using a roller (700) having a flexible wall (402). The roller rolls along the wall due to the movement of building platform (102).

A flexible wall (402) is deformed by the pressure of the feedstock. To avoid jeopardizing the building process, the deformations must be minimized by structural measures. According to the invention, flexible wall (402) is supported by a rigid wall (400). According to the invention, the coefficient of friction between the contacting materials must be less than that between the rigid wall and the particulate material.

Typical material pairings according to the invention are metal/plastic contacts or pairings as [sic; of] different metals. For example, flexible wall (402) made of metal may be designed as a thin sheet-metal band. Rigid wall (400) in this design is coated with plastic or brass strips (900). The wall may also be designed as a plastic belt, which is run off a metal surface.

The belt may preferably also be made of multiple materials. For example, a contact material to the particulate material may have a particularly resistant design. The rigidity may be provided by a special strap. An antifriction coating may be applied to the back.

Likewise, a flexible wall (402) may also slide on rollers (901). Powder-impermeable link chains are suitable for this purpose. The frictional forces may be further reduced with respect to tribological pairings. In terms of design, however, rollers of this type may be sensible only when used in large devices.

The aforementioned device, having two walls which do not move relative to the feedstock, may also be designed with four immobile walls. A device of this type would greatly reduce the frictional forces similarly to the aforementioned device having 4 rigid, upright walls according to the invention.

Other preferred aspects as well as an example of one preferred specific embodiment and advantages of the invention are discussed below.

Example of a preferred job box according to the invention

FIGS. 12 and 13 show a build container, which is particularly advantageous according to the invention.

The container is designed for a build volume of approximately 2,000 liters. When using foundry molding materials, such as sand or chrome ore, as the particulate materials, the feedstock weight may be up to 4,500 kg. During the building process, 300 μm must be supplied with the building platform as common layer thicknesses. The positioning uncertainty should be less than +/−30 μm for process-secure construction.

To reduce static deformations and minimize the effect of backlashes, the sequence of a layer application is as follows. The building platform is first lowered by an amount which is much greater than the targeted layer thickness, starting from the position of the last selectively solidified layer. Only then is the building platform placed in the desired position. This position is one layer thickness lower that the last layer already applied and solidified.

During the positioning, different components, such as the machine frame or the building platform, are deformed by the active forces. The building platform may then become stuck in the build container if it is not sufficiently loaded by the powder feedstock, and the positioning movement follows only after all backlashes have been resolved and the deformation reaction forces of the components overcome the frictional forces. This distance at least must be provided during lowering.

The building platform must then move upward into the predetermined position. The traveling distance here as well should at least pretension the device to the extent that stable conditions are achieved.

To safely account for this positioning uncertainty, the constantly growing weight force during the building process is less problematic than the forces caused by feedstock friction. These forces not only grow along with the weight force, but they have an unpredictable nature, due to the settling of the feedstock and the known stick-slip effect. The positioning uncertainty therefore increases markedly due to these forces.

The device according to FIG. 12 has 2 fixed walls (400). These walls are made of solid aluminum plates, which have recesses on the outer side for the purpose of reducing the weight. The inner areas of the walls of this build container have smooth, milled surfaces.

Building platform (102) has a greatly ribbed design, due to the heavy weight forces. The building platform typically has a rectangular shape defining long sides (1212) and short sides (1210) of the build container. The drive engagement takes place on the short sides in each case. The long sides are equipped with a seal. The seal has a two-part design. To set an even contact pressure and thus to form a secure seal, there is a spring element and a seal, which is able to slide smoothly along the walls of the build container. The spring element is a cord, which has a rectangular cross section and is made of silicone foam. The seal is a felt cord having a rectangular cross section.

In its lower end position, the building platform is in the build container. This ensures that the build container is able to be removed from the machine when the drive engagements are released.

The short sides are fixedly connected to flexible container wall (402).

In this build container, flexible wall (402) is made of an aluminum link chain (1202). The latter comprises plates which are 20 mm wide and which are interconnected by rubber strips.

The short side wall has a rigid wall (400) on the inside. The latter is designed as a welded frame made of rectangular tube profiles. These profiles support plastic rails (900) on the inside of the build container. These rails minimize friction.

This wall supports a return roller (700) on its upper end. Aluminum link chain (1202) is guided over this roller. Weights (1300) are mounted on aluminum link chain (1202) on the side of the wall facing away from the container interior. These weights ensure a taught chain during the upward travel.

The drive engagements are guided around this external link chain. As a result, they are easy to contact by the 3D printing device.

The sealing action between the aluminum link chain and rigid wall (400) on the long side of the build container is once again achieved by a felt cord. A recess, which guides the sealing cord, is present on the plate of the long side.

The upper edge of the build container is equipped with profiles in the area of the return roller, which rectangularly form the container interior. The friction which occurs here may be disregarded, since the feedstock pressure is still very low in this position.

The long and short walls form a frame, which, together with the building platform, represents a container. The latter is reinforced by a floor structure (1201). Skids are additionally mounted on the underside thereof to enable the container to move with the aid of a roller transport system.

Devices for connecting the container and the 3D device are present on the short walls. These devices may be locked after the container is inserted. The container is thus positioned and locked in place.

The build container is lined with additional metal sheets (1200) for the purpose of sealing against external contamination.

LIST OF REFERENCE NUMERALS

Figure 1:
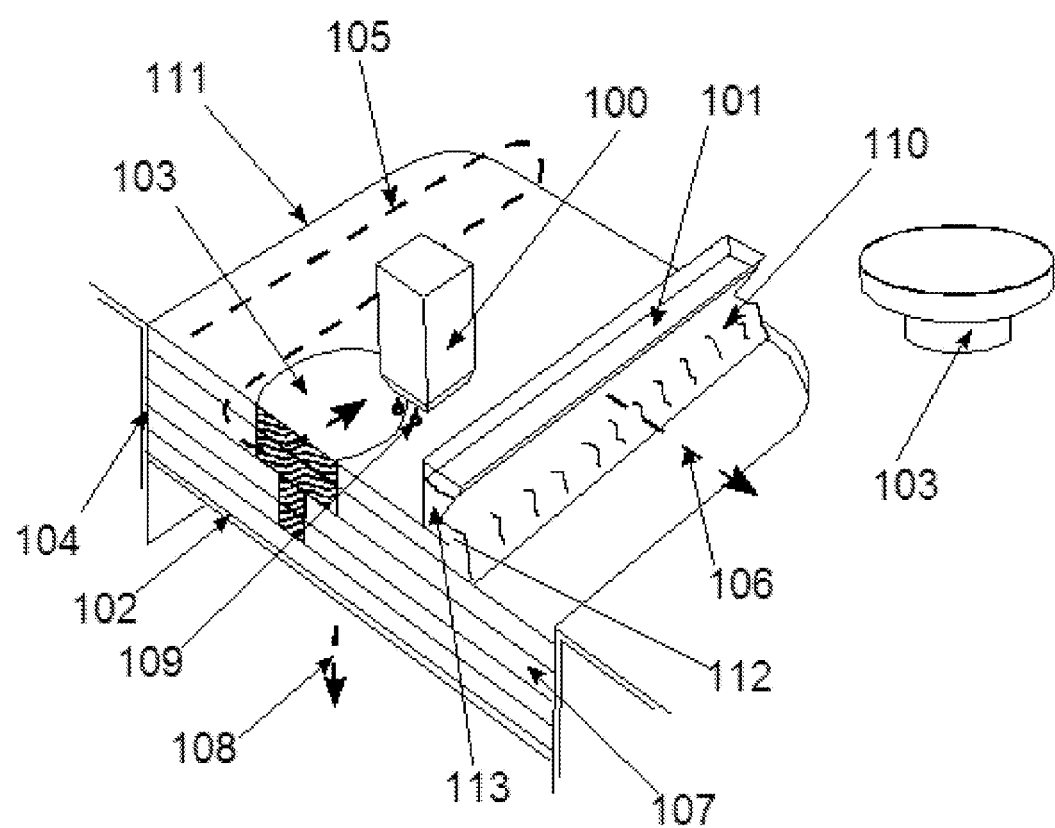
FIG. 1: shows a schematic representation of the components of a powder-based 3D printer in a sectional isometric view.
Figure 2:
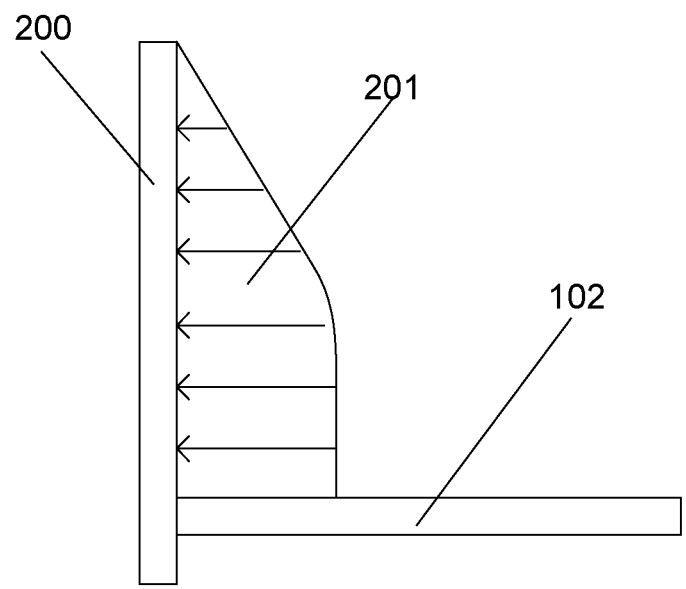
FIG. 2: shows a schematic representation of the effect of the force of the powder feedstock.
Figure 3:
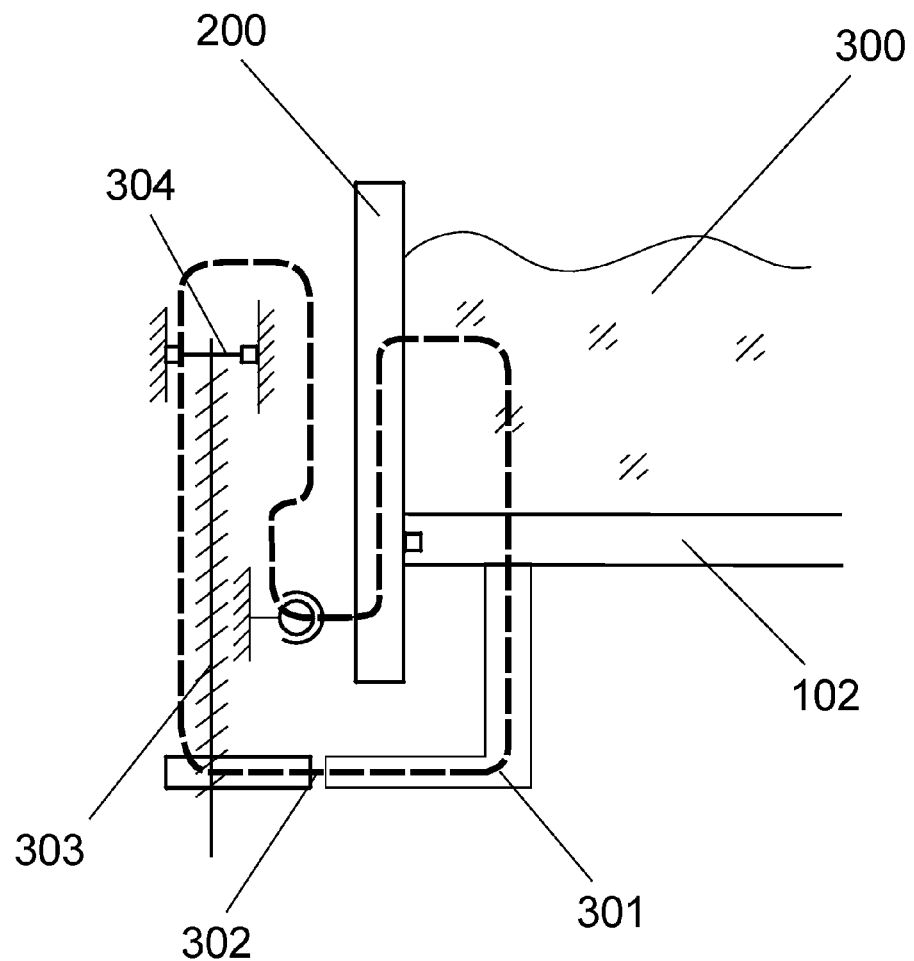
FIG. 3: shows a diagram of the flux of force in a device according to the prior art.
Figure 4:
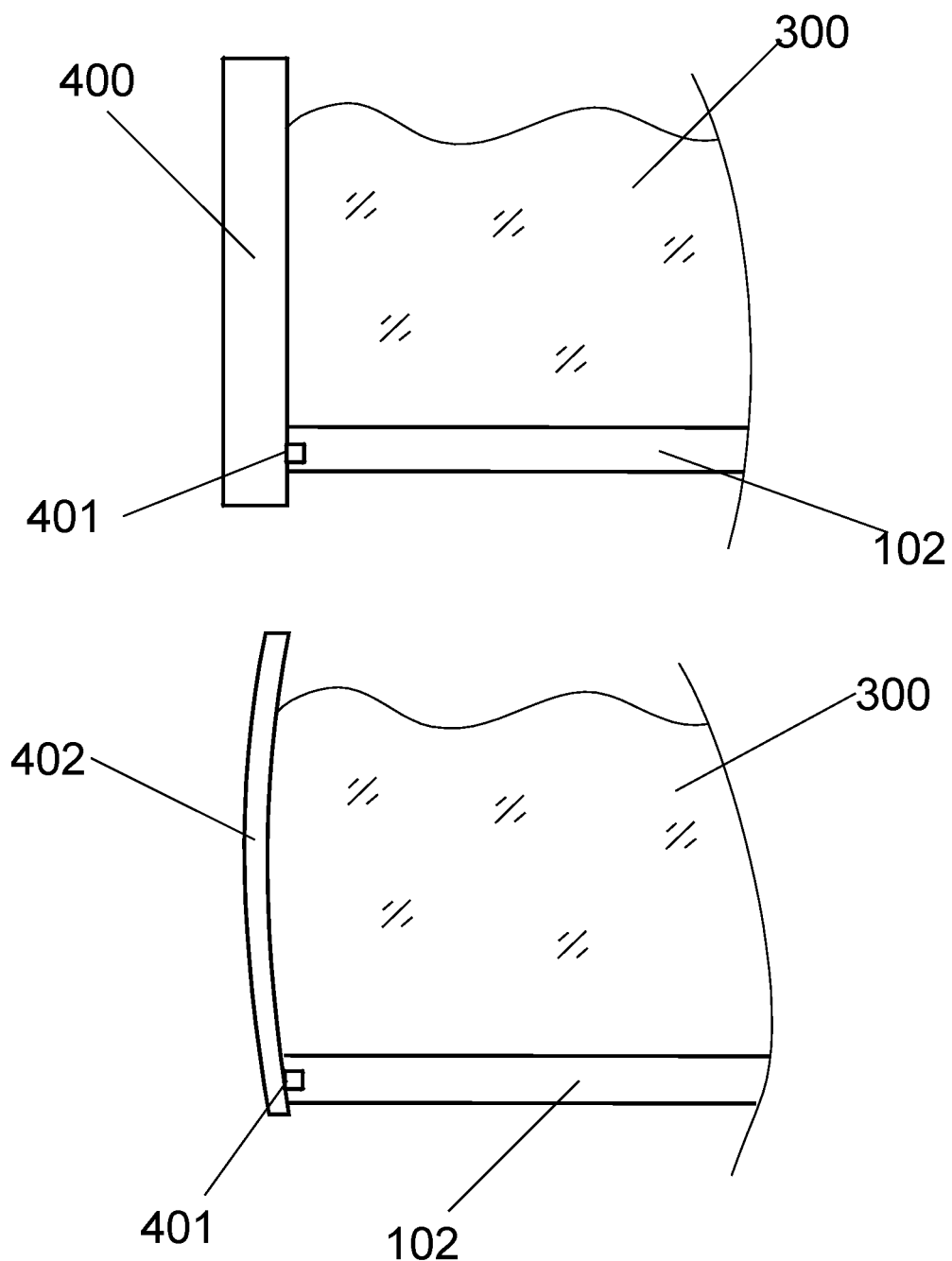
FIG. 4: shows a representation of a rigid and a flexible container wall.
Figure 5:
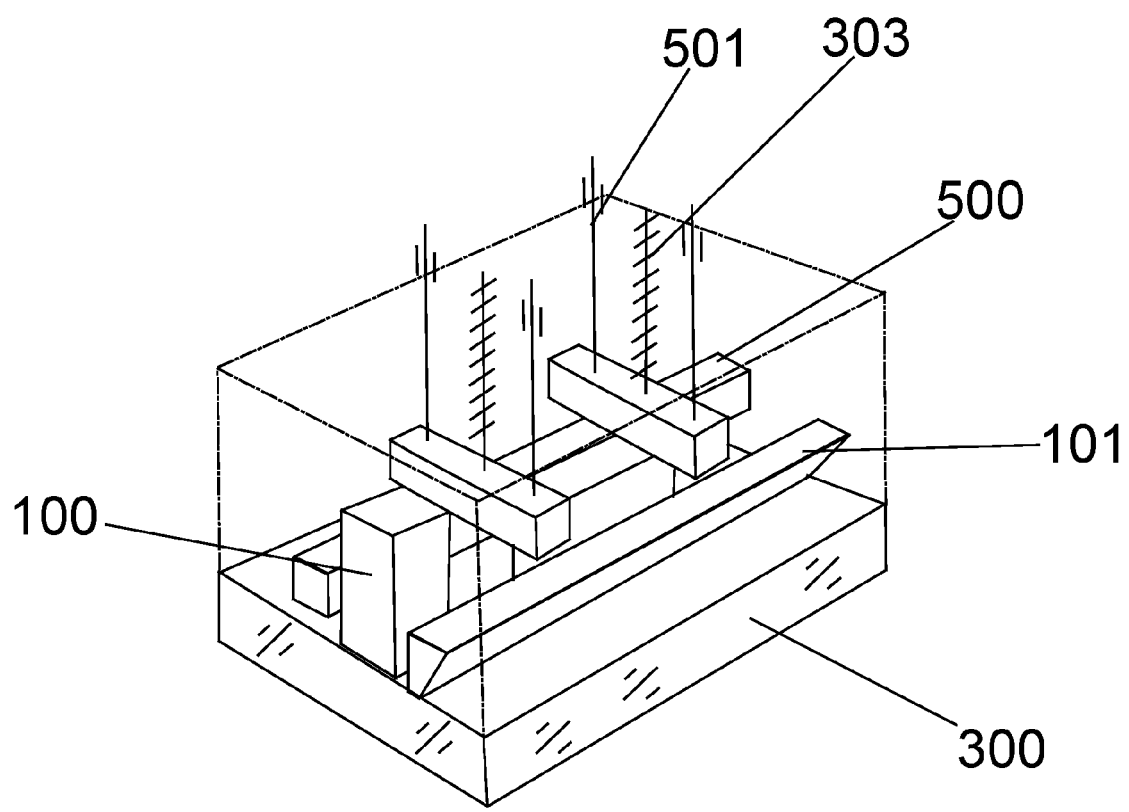
FIG. 5: shows a device, including a build container which has four rigid walls which are not moved relative to the feedstock.
Figure 6:
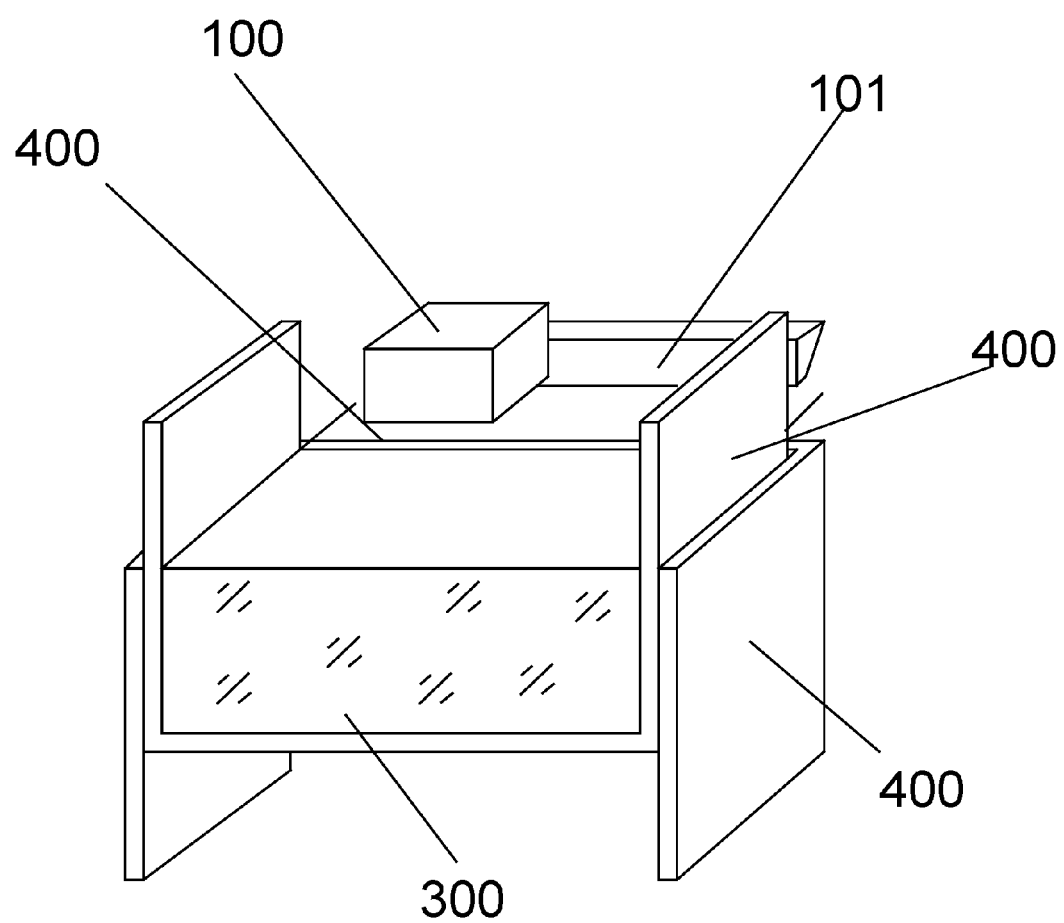
FIG. 6: shows a design of a build container having two rigid walls which are not moved relative to the feedstock and two rigid walls which are moved relative to the feedstock.
Figure 7:
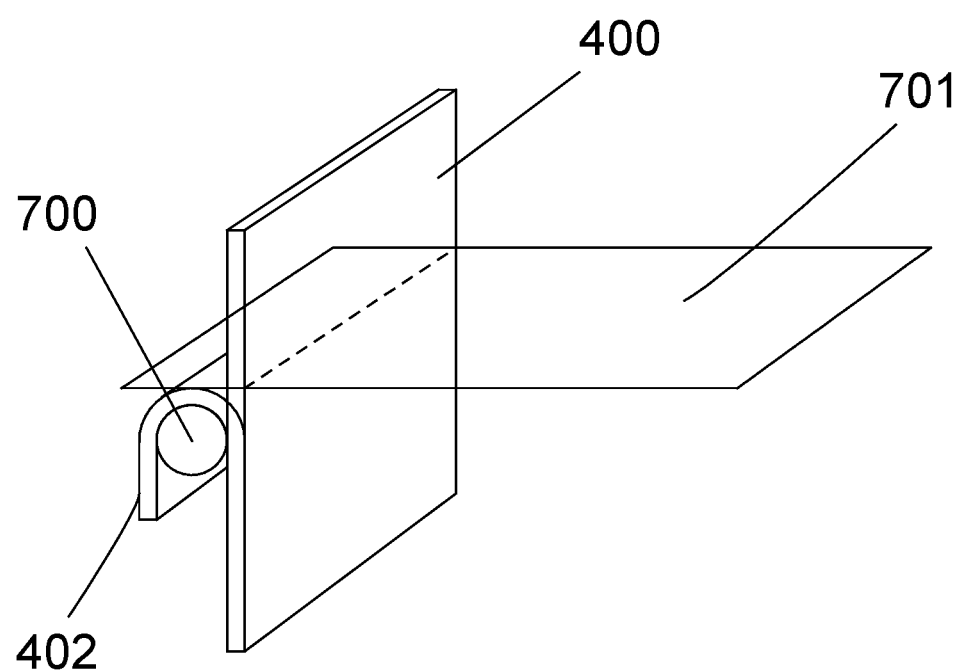
FIG. 7: shows a diagram of the avoidance of walls in the displacement area of the dosing unit and coater due to flexible walls.
Figure 8:
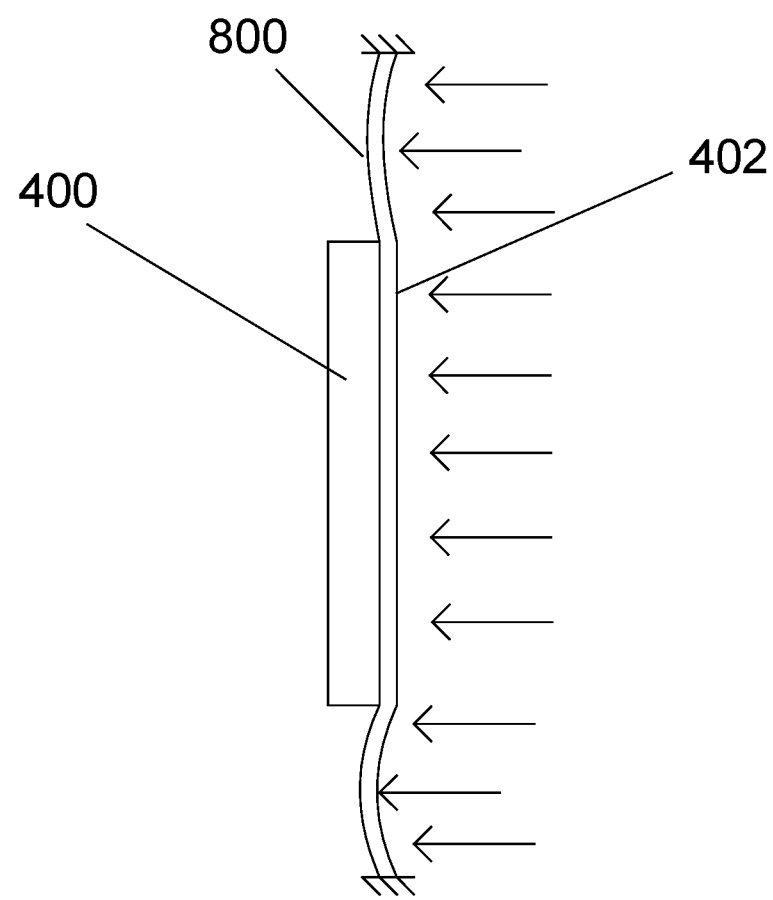
FIG. 8: shows a diagram of the discharge of compressive forces via consecutively connected walls.
Figure 9:
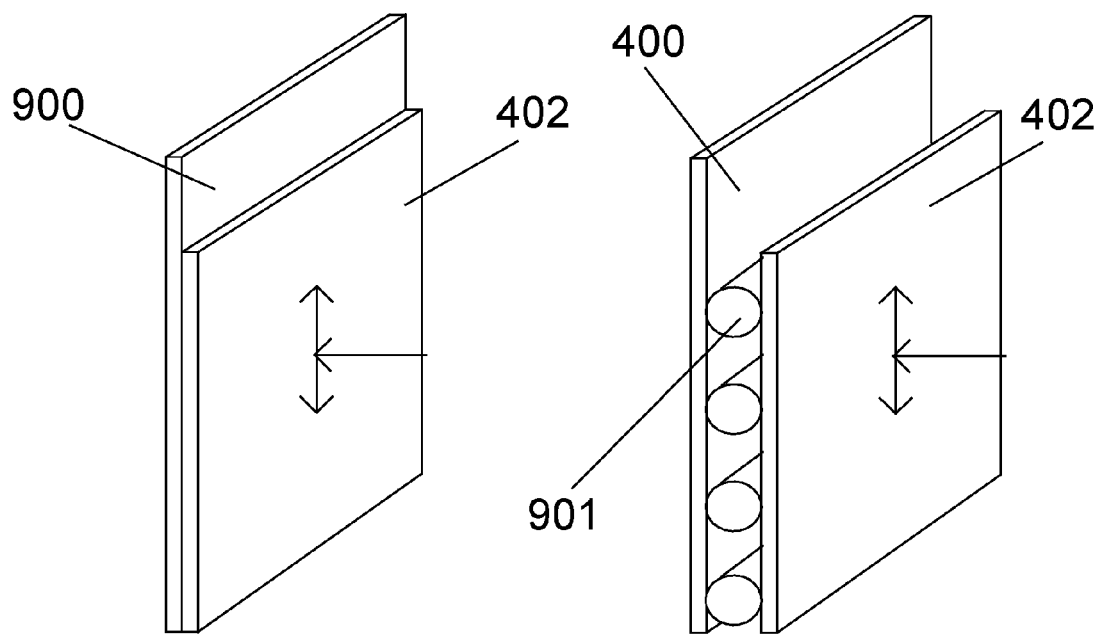
FIG. 9: shows the minimizing of the forces through the use of a tribological pairing; minimizing of the forces through the use of rollers.
Figure 10:
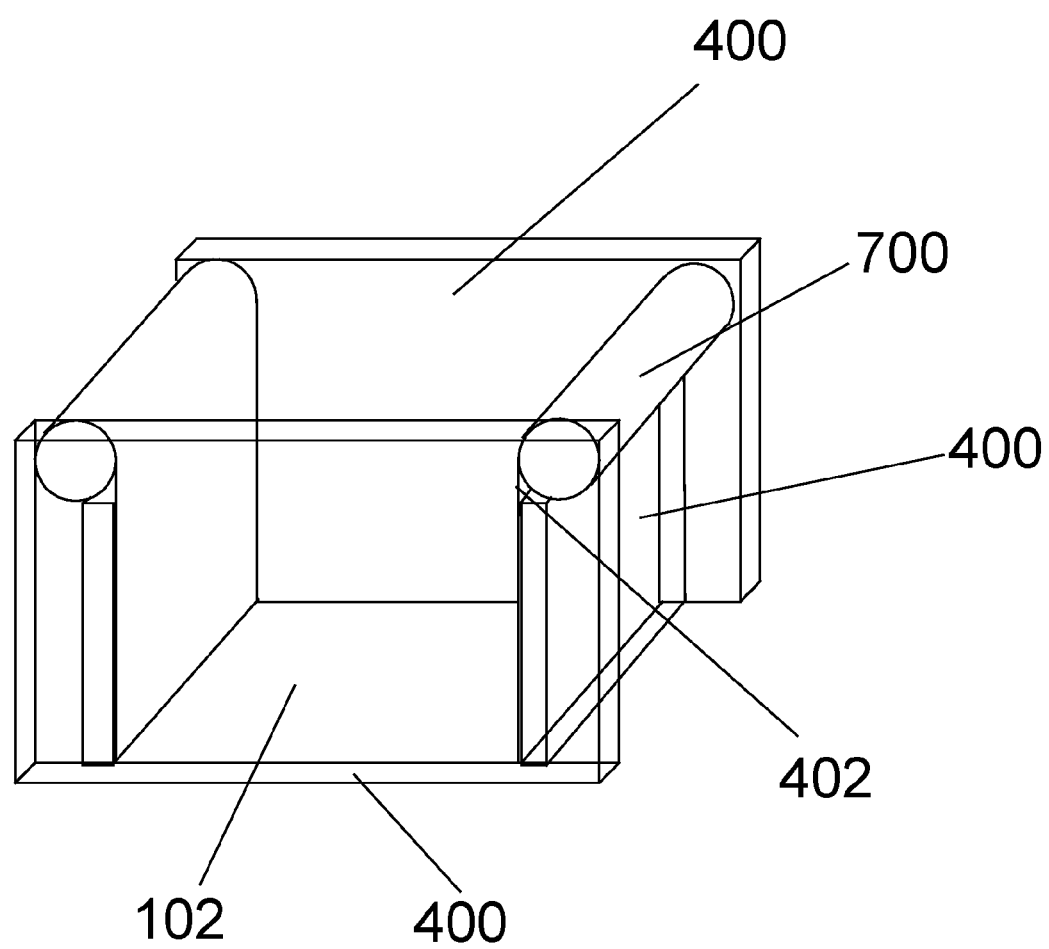
FIG. 10: shows a build container having two flexible walls which are not moved relative to the feedstock.
Figure 11:
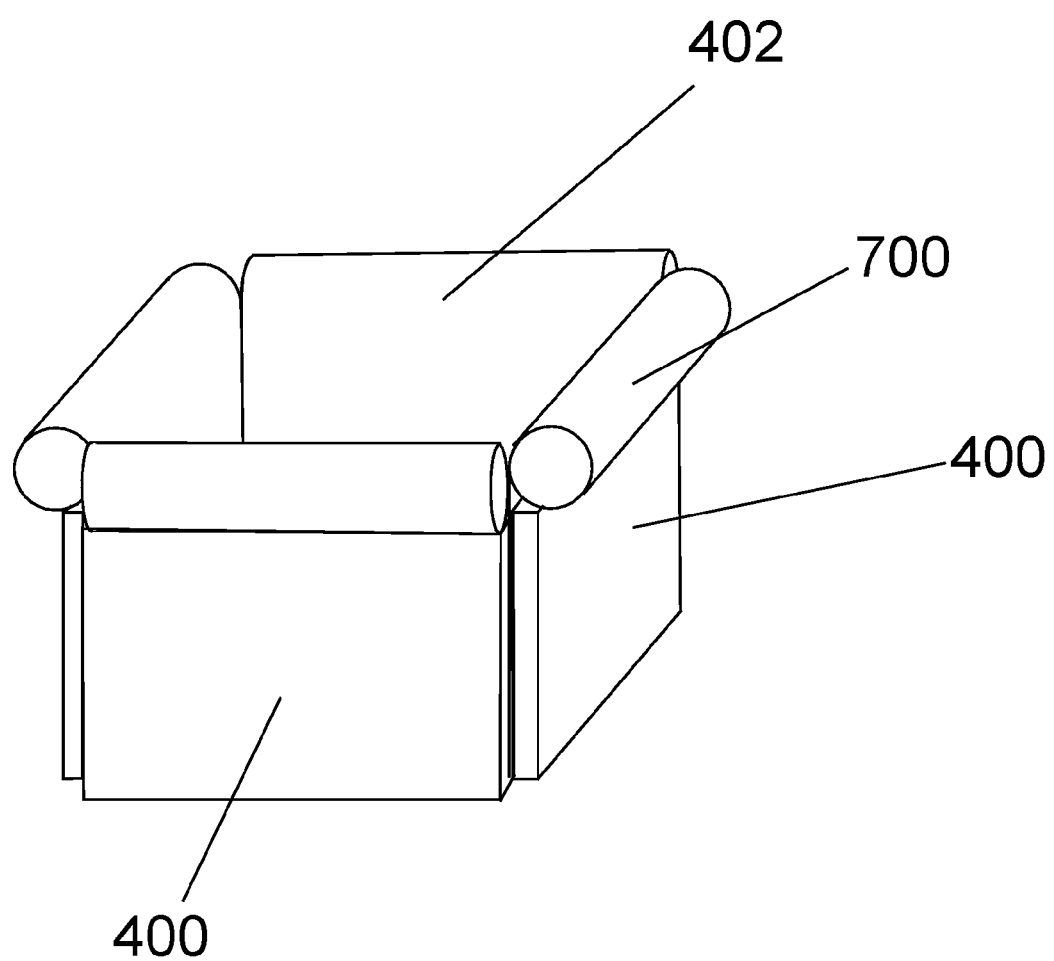
FIG. 11: shows a build container having four flexible walls which are not moved relative to the feedstock.
Figure 12:
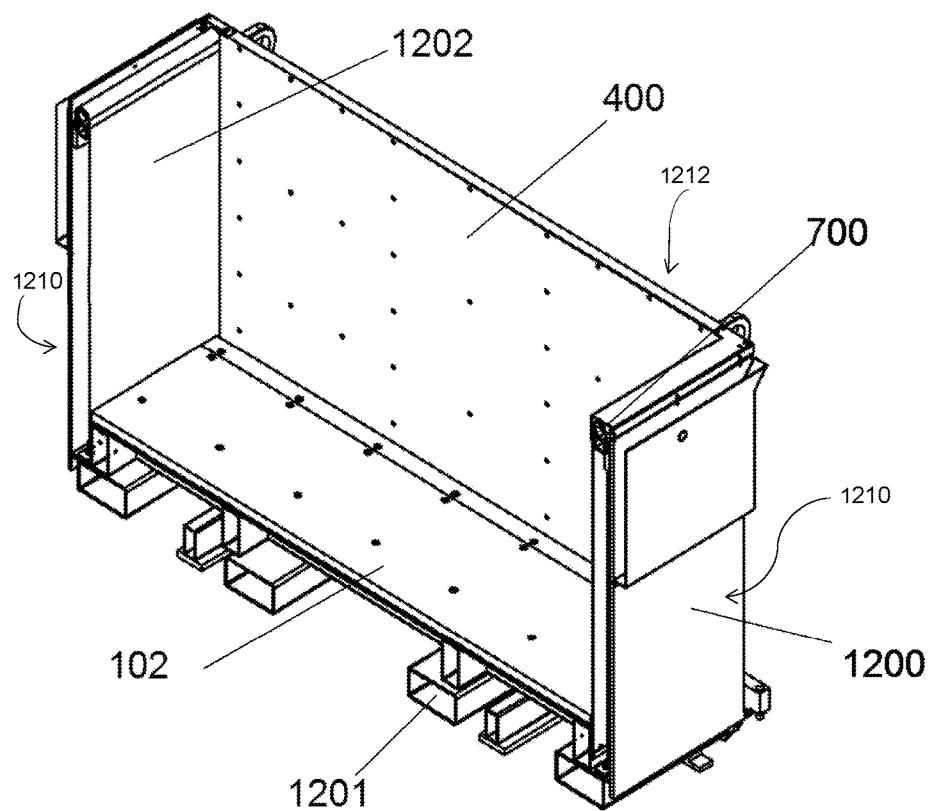
FIG. 12: shows a sectional representation of a build container having flexible walls which are not moved relative to the feedstock.
Figure 13:
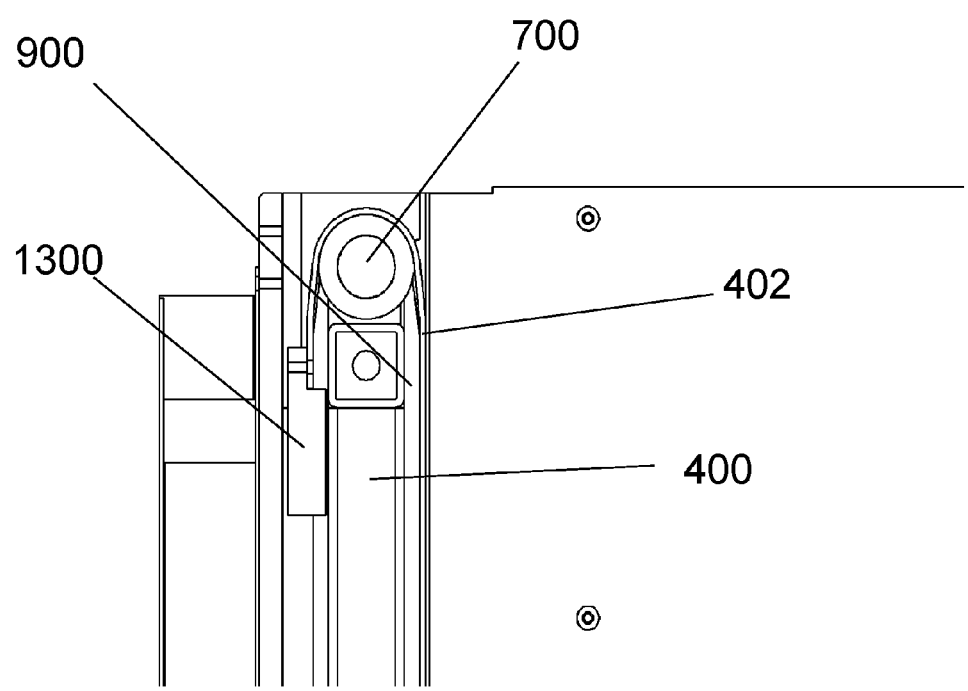
FIG. 13: shows design details of a build container having flexible walls which are not moved relative to the feedstock.

100 Binder dosing device
101 Powder coater
102 Building platform
103 Component (3D molded part)
104 Build space boundary
107 Powder layers
200 Wall
201 Force profile
300 Particulate material
301 Driving point
302 Coupling
303 Lifting spindle
304 Bearing
400 Rigid wall
401 (Felt) seal
402 Flexible wall
500 Positioning unit
501 Guides
700 Return roller
701 Printing and coater plane
800 Free deflection
900 Sliding surface
901 Rollers
1200 Housing
1201 Base
1202 Aluminum link chain
1210 Short side
1212 Long side
1300 Counter-weight

What is claimed is:

1. A build container for a device for producing three-dimensional objects by layering, comprising: a build space on a building platform having a rectangular shape defining short sides and long sides of the build container, wherein the build space is adjustable in a height and is within the build container; wherein during a displacement of the building platform to adjust the height of the build space, a kinetic friction between constructed layers and at least two side walls is reduced or essentially avoided, the building platform and the at least two side walls being moved at the same speed, wherein the build container includes a drive engagement on each of the short sides for attaching to a Z-axis drive unit, and wherein the only movement of the build platform during building of the three-dimensional objects is a vertical movement.

2. The build container of claim 1, wherein the at least two side walls includes 3 or 4 side walls.

3. The build container of claim 1, wherein the at least two side walls of a build container are movable in the build direction.

4. The build container of claim 1, wherein the at least two side walls are not rigid with respect to a particulate feedstock pressure and are supported via additional side walls.

5. The build container of claim 1, wherein at least one of the at least two side walls is designed to be flexible in one direction.

6. The build container of claim 1, wherein the at least two side walls are a segmented wall and/or a metallic wall and are designed to be flexible in one direction.

7. The build container of claim 1, wherein a metal/plastic tribological pairing is used to reduce the friction effect.

8. The build container of claim 1, wherein a supported belt, which is flexible in all directions, is used as at least one of the at least two of the side walls.

9. The build container of claim 1, wherein a continuous belt is used as at least one of the at least two side walls.

10. The build container of claim 1, wherein a finite belt is used as at least one of the at least two side walls and is tensioned by one or more springs or a weight force.

11. The build container of claim 1, wherein the build container is capable of attaching to and then removing from a 3D printing device by engaging and disengaging the 3D printing device with the drive engagement, wherein the 3D printing device including a coater unit and a print head for constructing layers of particulate material and selectively printing a binder.

12. The build container of claim 3, wherein the at least two side walls of the build container are displaceable relative to two fixed side walls.

13. The build container of claim 12, wherein the at least two side walls of the build container are rigid with respect to a particulate feedstock pressure.

14. The build container of claim 5, wherein the at least two side walls include four side walls that are designed to be flexible in one direction.

15. The build container of claim 6, wherein the at least two side walls include three or four side walls.

16. The build container of claim 1, wherein the build container includes an additional drive engagement positioned for attaching to an additional Z-axis drive unit on a different side of the build container.

17. A device for constructing three-dimensional objects comprising the build container of claim 1, a coating device for applying a particulate feedstock material in layers over the build platform, and the Z axis drive unit on a side of the build container and attached to the build container by the drive engagement.

18. The device of claim 17, wherein at least one roller bearing is used to reduce the kinetic friction.

19. The device of claim 17, wherein the device includes a belt made of multiple materials and includes an antifriction layer.

20. The device of claim 17, wherein a finite belt is wound up in an upper area of the build container.

21. The device of claim 17, wherein the Z-axis drive unit is a lifting spindle.

22. A method for producing three-dimensional objects by layering comprising the steps of: constructing layers of a three-dimensional object with a coater for applying particulate material; wherein between a process of constructing two layers, a build platform is displaced to adjust a height of a build space within a build container, the build container is adjustable in height and have a plurality of side walls; wherein during a step of displacing the building platform, kinetic friction between the constructed layers and at least two side walls of the plurality of side walls is reduced or essentially avoided, wherein the building platform and the at least two side walls are moved at the same speed; wherein a Z-axis drive unit positioned on a side of the build container drives the build container in a vertical direction, wherein the Z-axis drive unit is attached to a drive engagement of the build container, and wherein the only movement of the build platform during building of the three-dimensional objects is the vertical movement.

23. The device of claim 22, wherein the Z-axis drive unit is a lifting spindle.

24. The method of claim 22, wherein the method comprises a step of selectively applying a binder material over a layer of particulate material.

* * * * *